(12) United States Patent
Yamada et al.

(10) Patent No.: US 7,688,003 B2
(45) Date of Patent: Mar. 30, 2010

(54) METHOD OF LIGHTING HIGH PRESSURE MERCURY LAMP, LIGHTING DEVICE FOR THE SAME, LAMP SYSTEM AND PROJECTION DISPLAY UNIT

(75) Inventors: Go Yamada, Osaka (JP); Syunsuke Ono, Osaka (JP); Tsuyoshi Ichibakase, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 12/091,167

(22) PCT Filed: Nov. 2, 2006

(86) PCT No.: PCT/JP2006/322021

§ 371 (c)(1),
(2), (4) Date: Apr. 22, 2008

(87) PCT Pub. No.: WO2007/052770

PCT Pub. Date: May 10, 2007

(65) Prior Publication Data

US 2009/0278469 A1    Nov. 12, 2009

(30) Foreign Application Priority Data

Nov. 4, 2005  (JP)  ............................. 2005-321224

(51) Int. Cl.
  *H05B 37/02*    (2006.01)
(52) U.S. Cl. ..................... 315/291; 315/307; 315/308
(58) Field of Classification Search ................. 315/307, 315/308, 291, DIG. 5, DIG. 2, 224, 246, 315/247

See application file for complete search history.

(56) References Cited

U.S. PATENT DOCUMENTS

| | | | |
|---|---|---|---|
| 6,445,133 B1 * | 9/2002 | Lin et al. | 315/57 |
| 6,943,503 B2 * | 9/2005 | Ozasa et al. | 315/224 |
| 2003/0062855 A1 | 4/2003 | Ishihara et al. | |
| 2007/0164687 A1 | 7/2007 | Watanabe et al. | |

FOREIGN PATENT DOCUMENTS

| | | |
|---|---|---|
| JP | 2003-100490 | 4/2003 |
| JP | 2003-131324 | 5/2003 |
| JP | 2005-38815 | 2/2005 |

\* cited by examiner

*Primary Examiner*—David Hung Vu

(57) ABSTRACT

An object of the present invention is to provide a lighting method and the like that can prevent a lamp temperature of each individual high-pressure mercury lamp from being beyond a proper temperature range of a halogen cycle. The lighting method maintains a discharge of the high-pressure mercury lamp that has a function of the halogen cycle. The control is performed as follows. From when the high-pressure mercury lamp is lighted up to when a lamp voltage Vla reaches a first voltage value V1, a constant current control is performed. When the lamp voltage Vla reaches the first voltage value V1, the constant current control is switched to a constant power control which is performed at a first power value W1. While the discharge of the lamp is maintained, when the lamp voltage Vla reaches a voltage value (second voltage value V2) at which a state of the halogen cycle deviates from a proper state, the constant power control is performed by reducing the first power value W1 to a second power value W2.

14 Claims, 14 Drawing Sheets

METHOD OF LIGHTING HIGH PRESSURE MERCURY LAMP, LIGHTING DEVICE FOR THE SAME, LAMP SYSTEM AND PROJECTION DISPLAY UNIT

TECHNICAL FIELD

The present invention relates to a lighting method or a lighting apparatus of a high-pressure mercury lamp, a lamp system having the high-pressure mercury lamp in combination with the lighting apparatus, and a projection type display apparatus that uses the high-pressure mercury lamp as a light source.

BACKGROUND ART

In a high-pressure mercury lamp, mercury that is a light-emitting material is enclosed in a discharge space in a discharge vessel, and a pair of electrodes is arranged so that tips of the electrodes are in opposition to each other in the discharge space. Some of such high-pressure mercury lamps have a discharge space in which halogen in addition to mercury is enclosed, in order to reduce electrode consumption using a function of a halogen cycle that occurs while a discharge of the high-pressure mercury lamp is maintained.

In such a high-pressure mercury lamp using the function of the halogen cycle, an applied voltage to the high-pressure mercury lamp, an enclosed amount of mercury or halogen, a distance between electrodes, and the like are determined so that the high-pressure mercury lamp is in a proper state in which the halogen cycle effectively functions while a discharge of the high-pressure mercury lamp is maintained. Note that as a material of an electrode, tungsten is commonly used.

The above high-pressure mercury lamp (hereinafter, referred to as "lamp") is operated (including a case in which a discharge of the high-pressure mercury lamp is maintained) by a constant current control until a lamp voltage reaches a predetermined voltage. At an instant when the lamp voltage reaches the predetermined voltage, the constant current control is switched to a constant power control to maintain a power supplied to the lamp at that instant as a target power value.

When an accumulated time during which a discharge of a lamp is maintained (hereinafter, referred to as "accumulated operating time") becomes longer, a state of the halogen cycle deviates from the proper state. Due to this deviation, the halogen cycle does not effectively function, and tungsten, which is to be evaporated from an electrode and accumulated on the electrode, is adhered to an inner surface of a discharge vessel that forms a discharge space (blackening phenomenon).

If the discharge is further maintained, heat is accumulated in tungsten which is adhered to the discharge vessel, and a glass in a part of the discharge vessel, to which tungsten is adhered, is recrystallized and devitrified. Because of the devitrification phenomenon and the blackening phenomenon, emission of light from the discharge space to outside is shielded, and an amount of the emission of light from the lamp is reduced, which leads to shortening of a life of the lamp (it is regarded as the end of a life of the lamp when luminance becomes about 50% of initial luminance).

As a technique of extending a life of a lamp, the following technique (patent document 1) is disclosed. A point at which deterioration of the lamp starts has been obtained by an experiment in advance. When an accumulated operating time reaches the point (predetermined time), a target power value for the constant power control is reduced.

Patent Document 1: Japanese Published Patent Application No. 2003-131324

DISCLOSURE OF THE INVENTION

Problems the Invention is Going to Solve

By the above technique of reducing the target power value when the accumulated operating time reaches the predetermined time, lives with regard to a large number of lamps can be substantially extended. However, it is hard to say that a target power value is reduced at a proper timing with regard to each individual lamp.

In detail, even if the predetermined time which is the above point is obtained by an experiment and the like, it is not true that individual lamps all start deteriorating when their accumulated operating time reach the above point, because of a difference of usage environments of lamps, a difference of continuous discharge times in one discharge, variations of lamps, or the like.

In view of the above problem, an object of the present invention is to provide a lighting method, a lighting apparatus, a lamp system, and a projection type display apparatus that extend a life of each individual high-pressure mercury lamp by reducing a target power value at a proper timing.

Means of Solving the Problems

In general design of a lamp, an applied voltage to the lamp (lamp voltage), an enclosed pressure of mercury or halogen, a distance between electrodes, and the like are determined so that a discharge of the lamp is maintained in the proper state of the halogen cycle. However, if the halogen cycle deviates from the proper state, a temperature in a discharge space may rise, or the distance between electrodes may become longer.

It is supposed to be preferable that the temperature in the discharge space or the distance between electrodes is actually measured, in order to change a target power value based on a change of the temperature or the distance between electrodes. However, it is not realistic to measure the temperature or the distance between electrodes. Therefore, the inventors of the present invention performed a test for checking whether or not some sort of characteristics relating to the lamp remarkably vary, in accordance with the change of the temperature or the distance between electrodes.

As a result of the test, the inventors found that when a state of the halogen cycle changes, a slope of a lamp voltage changes in a relation between an accumulated operating time and the lamp voltage. In detail, the inventors found that a slope of the lamp voltage when the halogen cycle is in the proper state is different from a slope of the lamp voltage after the state of the halogen cycle changes, in the relation between the accumulated operating time and the lamp voltage.

The above-mentioned object can be achieved by a lighting method for operating a high-pressure mercury lamp that has a function of a halogen cycle, by performing a constant power control when a lamp voltage is equal to or higher than a predetermined voltage value, to maintain a discharge of the high-pressure mercury lamp, wherein when the lamp voltage increases resulting from a state change of the halogen cycle, a step of shifting a target power value of the constant power control from an immediately previous power value to a smaller power value is performed at least one time, and a subsequent constant power control is performed at the smaller power value as the target power value.

Also, a range in which the lamp voltage is expected to be varied is divided into a plurality of voltage ranges, and a plurality of power values are set as the target power value in one-to-one correspondence with the voltage ranges, and when the lamp voltage reaches an n-th voltage range resulting from the state change of the halogen cycle, the target power value is shifted to an n-th power value corresponding to the n-th voltage range, where n is a natural number, and as n is larger, the voltage range is higher. When the lamp voltage reaches the n-th voltage range resulting from the state change of the halogen cycle, a temperature in a position of the high-pressure mercury lamp is beyond a predetermined proper temperature range of the halogen cycle, the position being a top in a surface of a discharge vessel of the high-pressure mercury lamp operated with a longitudinal direction thereof situated substantially horizontally.

Moreover, the high-pressure mercury lamp includes a pair of electrodes, and when the lamp voltage reaches the n-th voltage range resulting from the state change of the halogen cycle, a distance between the pair of electrodes is beyond a predetermined proper distance range. The n-th power value is in a range of 80% to 95% of an (n−1)-th power value.

Furthermore, the n-th power value is in a range of 80% to 95% of an (n−1)-th power value. The target power value is shifted stepwise from an (n−1)-th power value to the n-th power value. Also, the target power value is shifted stepwise from the (n−1)-th power value to the n-th power value.

The above-mentioned object can be achieved by a lighting apparatus for maintaining a discharge of a high-pressure mercury lamp that has a function of a halogen cycle, the lighting apparatus comprising: a lighting unit operable to, when a lamp voltage is equal to or higher than a predetermined voltage value, perform a constant power control at a predetermined power value as a target power value to maintain the discharge of the high-pressure mercury lamp; and a target power value switching unit operable to shift the target power value of the constant power control from an immediately previous power value to a smaller power value, when the lamp voltage increases resulting from a state change of the halogen cycle, wherein the lighting unit performs a subsequent constant power control at the smaller power value as the target power value.

Also, a range in which the lamp voltage is expected to be varied is divided into a plurality of voltage ranges, and a plurality of power values are set as the target power value in one-to-one correspondence with the voltage ranges, and when the lamp voltage reaches an n-th voltage range resulting from the state change of the halogen cycle, the target power value is shifted to an n-th power value corresponding to the n-th voltage range, where n is a natural number, and as n is larger, the voltage range is higher.

On the other hand, the above-mentioned object can be achieved by a lamp system comprising: a high-pressure mercury lamp that has a function of a halogen cycle to reduce electrode consumption; and a lighting apparatus for lighting up the high-pressure mercury lamp, wherein the lighting apparatus is the above-mentioned lighting apparatus.

On the other hand, the above-mentioned object can be achieved by a projection type display apparatus comprising: a high-pressure mercury lamp for a light source; and a lighting apparatus for lighting up the high-pressure mercury lamp, wherein the high-pressure mercury lamp has a function of a halogen cycle to reduce electrode consumption, and the lighting apparatus is the above-mentioned lighting apparatus.

EFFECTS OF THE INVENTION

In the lighting method of the present invention, a state change of the halogen cycle is judged based on a value of a lamp voltage detected from a high-pressure mercury lamp whose discharge is actually maintained, in order to perform the constant power control. Therefore, in the high-pressure mercury lamp whose discharge is actually maintained, a target power value can be reduced at a proper timing, and thus a life of the high-pressure mercury lamp can be extended.

Figure 1:
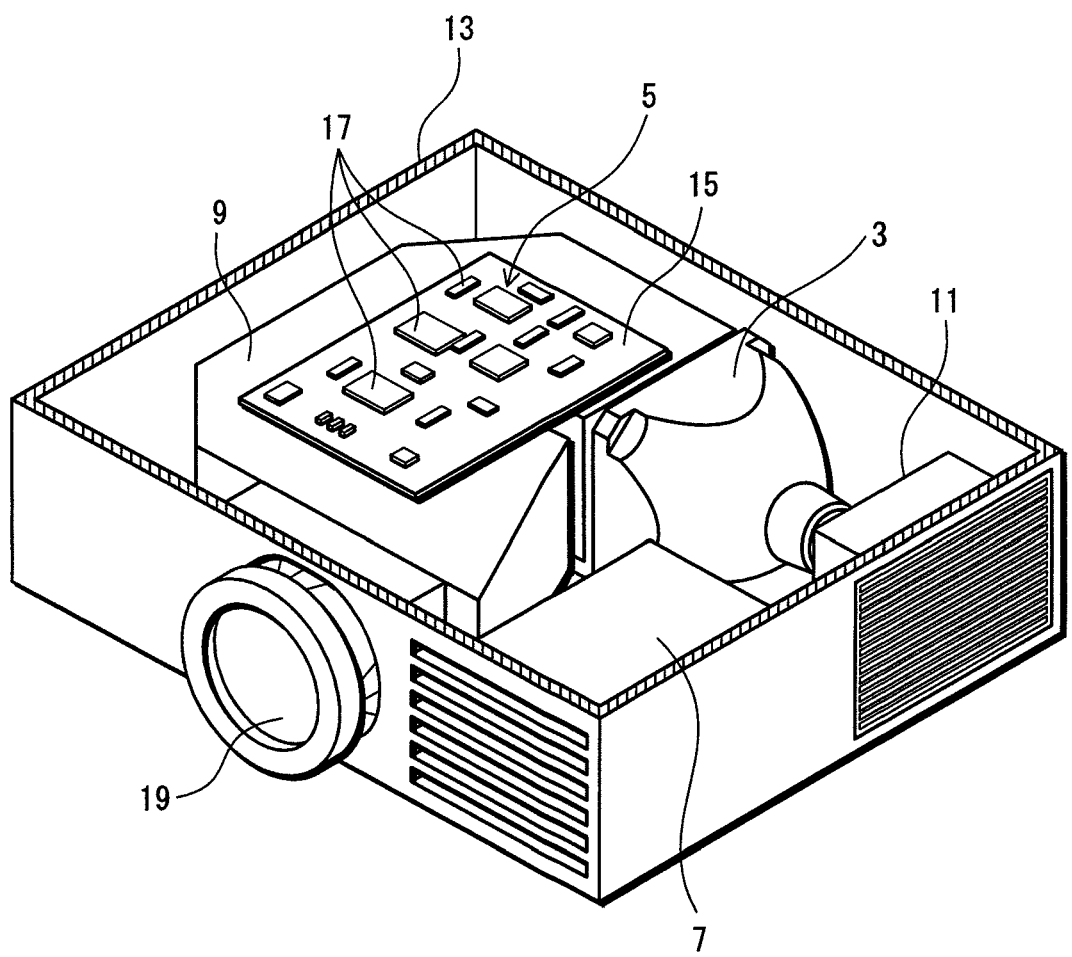
FIG. 1 is a partially cut away perspective view of a liquid crystal projector of an embodiment.

DESCRIPTION OF REFERENCE NUMERALS 1 liquid crystal projector
3 lamp unit
31 lamp
100 lighting apparatus
101 DC power supply unit
102 DC/DC converter
103 DC/AC inverter
104 high voltage generation unit
105 control unit
106 current detection unit
107 voltage detection unit
V1 first voltage value
V2 second voltage value
W1 first power value
W2 second power value

BEST MODE FOR CARRYING OUT THE INVENTION

The following describes a lighting apparatus using a lighting method of a high-pressure mercury lamp (hereinafter, referred to as "lamp") of an embodiment of the present invention, and a front-projection type image display apparatus using the lighting apparatus.

Embodiment

1. Front-Projection Type Display Apparatus

The following describes the front-projection type display apparatus (hereinafter, referred to as "liquid crystal projector") of the present invention, with reference to the attached drawings.

FIG. 1 is a partially cutaway perspective view of a liquid crystal projector of the embodiment.

As shown in FIG. 1, a liquid crystal projector 1 includes, in an enclosure 13, a lamp unit 3 having therein a lamp (not shown), a control unit 5, a power supply unit 7 including a lighting apparatus for lighting up the lamp, a lens unit 9 in which a condenser lens, a transmission-type color liquid crystal display panel, and a drive motor are built, a cooling fan 11, and the like.

The control unit 5 drives the color liquid display panel to display a color image, based on an image signal inputted from outside. Also, the control unit 5 controls the drive motor arranged in the lens unit 9 to perform a focusing operation and a zooming operation. Note that the control unit 5 is composed of a substrate 15 arranged on an upper surface of the lens unit 9, a plurality of electronic and electric components 17 mounted on the substrate 15, and the like.

The power supply unit 7 converts an AC 100 V power supply for home use to a predetermined DC voltage, and supplies the converted voltage to the control unit 5, the lighting apparatus, and the like.

The liquid crystal projector 1 condenses light emitted from the lamp unit 3 using the condenser lens and the like arranged in the lens unit 9, and the condensed light is transmitted through the color liquid crystal display panel arranged on a light path. Consequently, an image formed on the color liquid crystal display panel is projected on a screen (not shown) via a lens 19 and the like.

2. Lamp Unit

Figure 2:
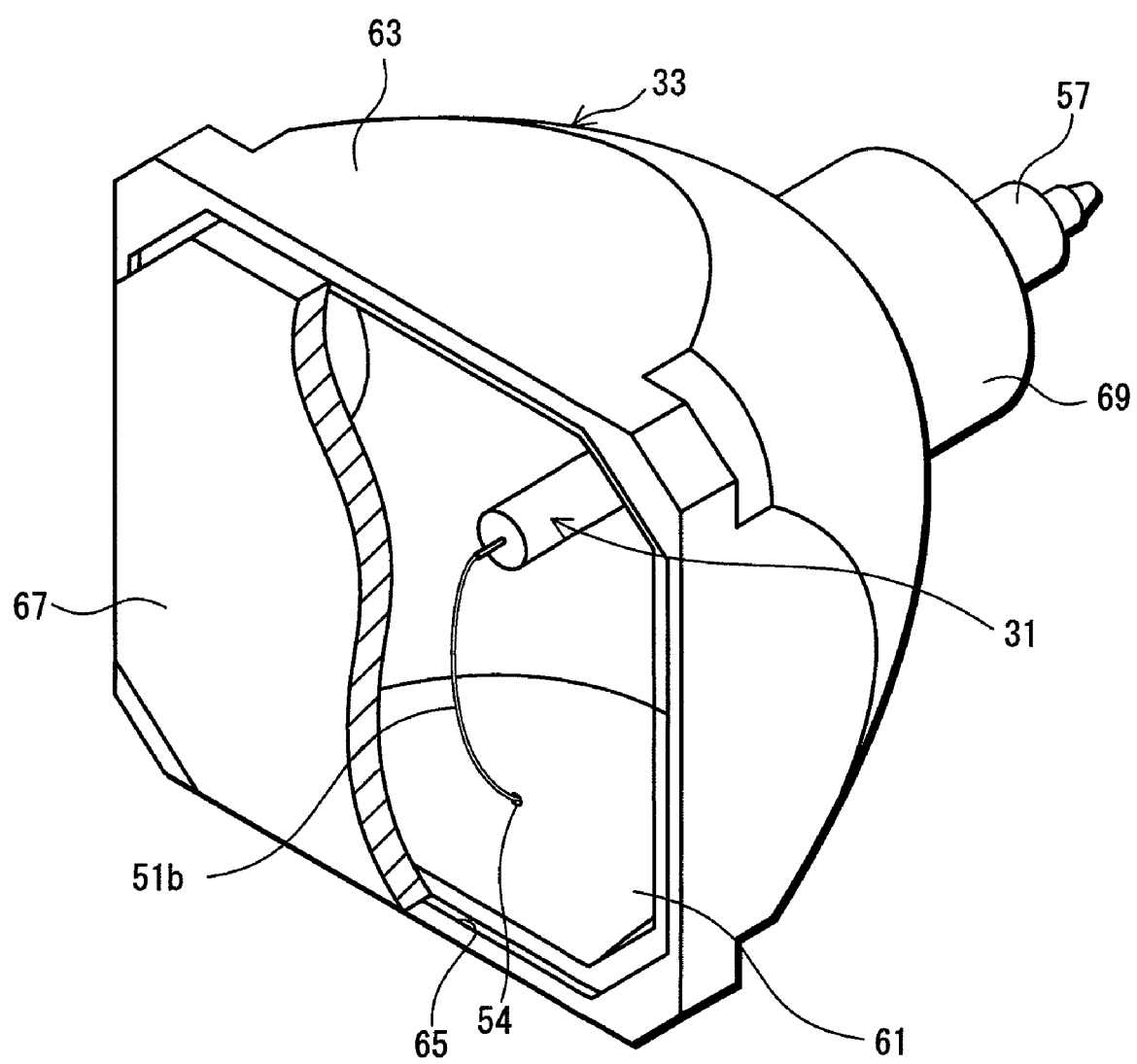
FIG. 2 is a perspective view of a lamp unit of the embodiment.
Figure 3:
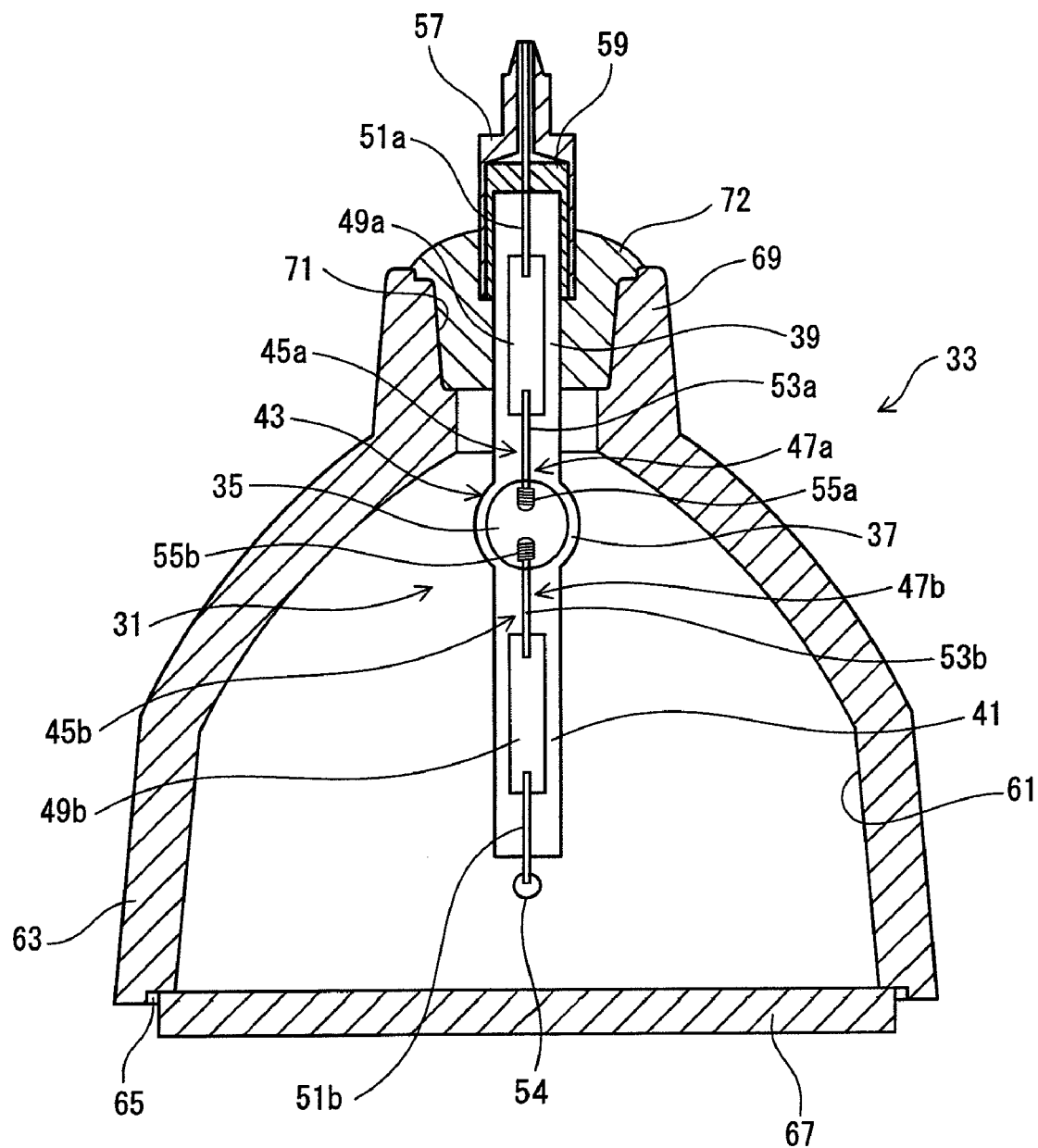
FIG. 3 is a plan view of the lamp unit, where a reflecting mirror is cut away to show an inner structure of a lamp.

FIG. 2 is a perspective view of the lamp unit of the embodiment, and FIG. 3 is a plan view of the lamp unit, where a reflecting mirror is cut away to show an inner structure of the lamp.

As shown in FIGS. 2 and 3, the lamp unit 3 includes a lamp 31 and a reflecting mirror 33 in which the lamp 31 is built.

(1) Structure of Lamp

As shown in FIG. 3, the lamp 31 includes a discharge vessel 43 which is composed of a light emitting part 37 having a discharge space 35 therein and sealing parts 39 and 41 arranged on respective sides of the light emitting part 37, and electrode assemblies 45a and 45b which are hermetically sealed at the sealing parts 39 and 41 respectively so that tips (electrode parts which will be described later) of the electrode assemblies 45a and 45b face each other in the discharge space 35.

The electrode assembly 45a is composed of an electrode part 47a, a metal foil 49a, and an external lead 51a which are connected (and fixed by, for example, welding) to one another in the stated order. Similarly, the electrode assembly 45b is composed of an electrode part 47b, a metal foil 49b, and an external lead 51b which are connected (and fixed by, for example, welding) to one another in the stated order. Here, the tips of the electrode assemblies 45a and 45b are the electrode parts 47a and 47b.

The external leads 51a and 51b extend to outside from outer ends of the sealing parts 39 and 41, to an opposite direction from the light emitting part 37. As shown in FIGS. 2 and 3, the external lead 51b passes through a through-hole 54 formed in the reflecting mirror 33 and extends to outside of the reflecting mirror 33.

The electrode part 47a is composed of an electrode rod 53a and an electrode coil 55a that is provided at a tip of the electrode rod 53a, and the electrode part 47b is composed of an electrode rod 53b and an electrode coil 55b that is provided at a tip of the electrode rod 53b. The electrode parts 47a and 47b are arranged to face each other so that the electrode rods 53a and 53b align substantially in a straight line in the discharge space 35. Note that in the electrode parts, the electrode rods and the electrode coils may be made from different materials or from the same material (such as tungsten).

In the electrode assemblies 45a and 45b, mainly the metal foils 49a and 49b are hermetically sealed to the sealing parts 39 and 41 respectively, such that the electrode coils 55a and 55b have a predetermined distance (which corresponds to "a distance between the pair of electrodes" in the present invention) in between. With this sealing, the discharge space 35 is formed in the light-emitting part 37, and as shown in FIG. 3, the electrode parts 47a and 47b extend into the discharge space 35 from the sealing parts 39 and 41, respectively.

In the discharge space 35, in addition to mercury which is a light-emitting material, a starting gas and a halogen compound for the halogen cycle are enclosed. Note that the halogen compound has an action of redepositing tungsten, which is evaporated from the electrode coils 55a and 55b while a discharge of a lamp is maintained, on the electrode coils 55a and 55b by the halogen cycle, i.e. an action of reducing consumption of the electrode parts 47a and 47b.

A base 57 is fixed to any one of the two outer ends of the sealing parts 39 and 41. For example, as shown in FIG. 3, the base 57 is fixed to the outer end of the sealing part 39 via cement 59 so as to cover the outer end, and the external lead 51a is connected to the base 57.

(2) Structure of Reflecting Mirror

As shown in FIGS. 2 and 3, the reflecting mirror 33 includes a main body member 63 which has a reflecting surface 61 being a concave surface, and a front glass 67 is provided at an opening 65 of the main body member 63. Note that the main body member 63 is bonded with the front glass 67 by, for example, a silicon-based adhesive.

The reflecting mirror 33 is, for example, a dichroic reflecting mirror, and reflects light emitted from the light-emitting part 37 of the lamp 31 in a predetermined direction (toward the front glass 67). The main body member 63 is in a shape of a funnel. As shown in FIG. 3, a through hole 71 is formed in a part 69 having a small diameter. The sealing part 39 of the lamp 31 is inserted through the through hole 71.

As shown in FIG. 3, the lamp 31 is fixed to the reflecting mirror 33 by, for example, cement 72 while the sealing part 39, to which the base 57 has been fixed, is inserted to a predetermined position in the through hole 71 of the part 69 having a small diameter of the main body member 63.

(3) Lighting Method of Lamp

The following describes a lighting method of the lamp 31. Note that the description here is about a case which includes one "step of shifting a target power value of the constant power control from an immediately previous power value to a smaller power value" in the present invention. There are two target power values, and two types of constant power controls are performed (when "n" is "2" in the present invention).

Figure 4:
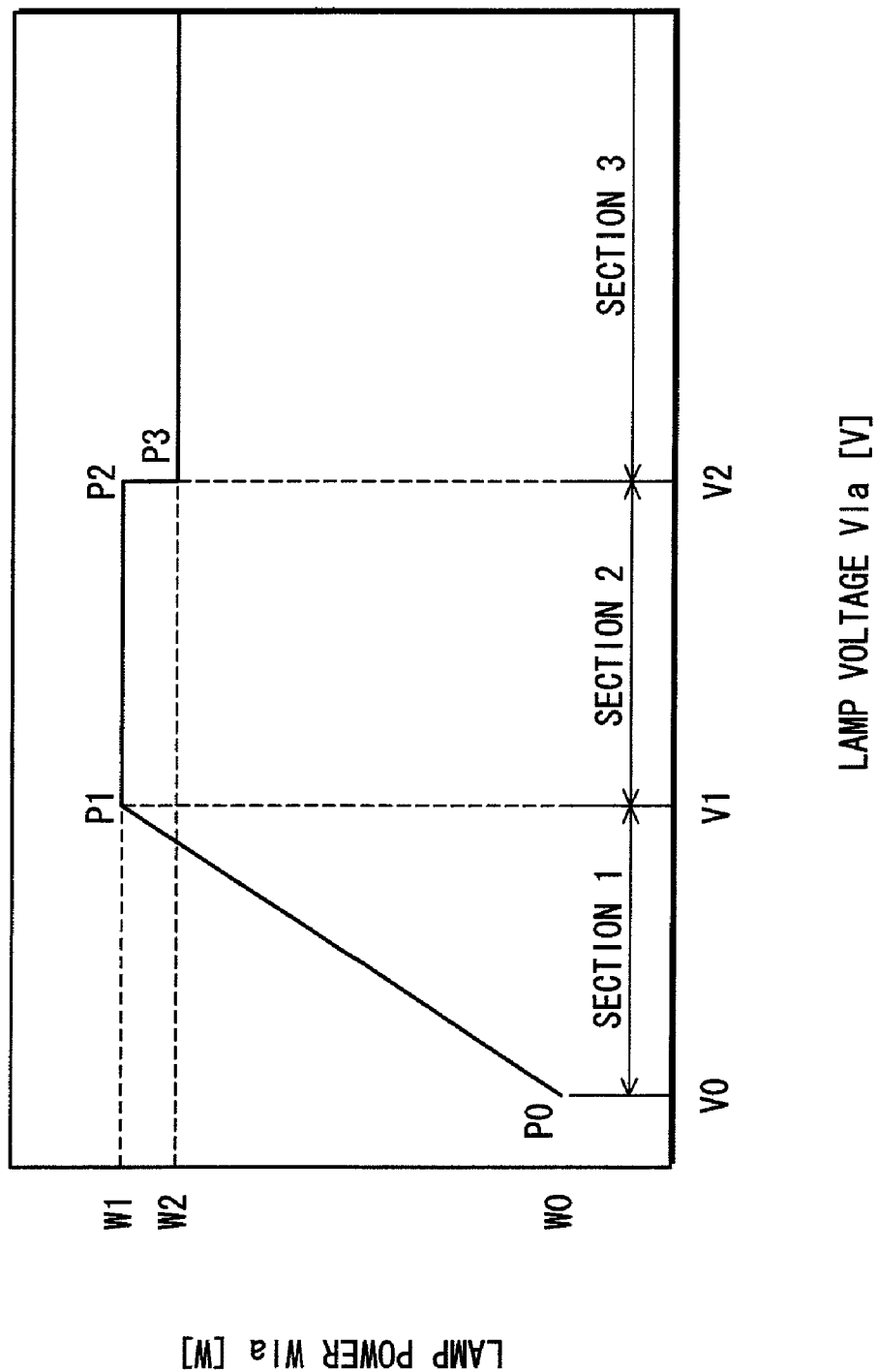
FIG. 4 is a diagram showing control characteristics of a high-pressure mercury lamp.

FIG. 4 is a diagram showing control characteristics of the high-pressure mercury lamp, and is a correlation diagram between a lamp voltage Vla and a lamp power Wla supplied after generating a breakdown by applying a high-voltage pulse to the lamp 31. Note that the above control characteristics are performed by a lighting apparatus which will be described later.

As shown in FIG. 4, in the lighting method of the embodiment, a constant current control is performed in a section 1, and a constant power control is performed in each of sections 2 and 3. The lamp voltage Vla in the section 1 is in a range of equal to or higher than an initial-voltage value V0 but lower than a first voltage value V1, the lamp voltage Vla in the section 2 is in a range of equal to or higher than the first voltage value V1 but lower than a second voltage value V2, and the lamp voltage Vla in the section 3 is in a range of equal to or higher than the second voltage value V2.

3-1) Section 1

In the constant current control in the section 1, the lamp power Wla varies in proportion to the lamp voltage Vla, from a starting point P0 at which lighting starts (the lamp voltage Vla is the initial voltage value V0, and the lamp power Wla is an initial power value W0) to a first point P1 at which the lamp voltage Vla is the first voltage value V1, and the lamp power Wla is a first power value W1.

3-2) Section 2

A target power value in the constant power control in the section 2 is the first power value W1, and generally is a rated lamp power. This constant power control is performed from the first point P1 which is an end of the constant current control in the section 1 to a second point P2 at which the lamp voltage Vla is the second voltage value V2, and the lamp power Wla is the first power value W1.

In the lamp 31, the lamp power Wla, a distance between electrodes, and the like are set so that the halogen cycle effectively functions by a halogen compound in a discharge space, in a state in which a discharge of the lamp 31 is maintained by the constant power control in the section 2. Also, the lamp voltage Vla of the lamp 31, which is constant power controlled in the section 2, generally rises as an accumulated operating time of the lamp 31 becomes longer. In other words, the lamp voltage Vla increases resulting from a state change of the halogen cycle.

3-3) Section 3

A target power value in the constant power control in the section 3 is a second power value W2 that is lower than the first power value W1 in the constant power control in the section 2. This constant power control starts to be performed from a third point P3 at which the lamp voltage Vla is the second voltage value V2, and the lamp power Wla is the second power value W2. Also, this constant power control is performed in a range in which the lamp power Wla is the same power value (second power value W2), and the lamp voltage Vla is higher than the second voltage value V2 at the third point P3.

3-4) Other

A value of a switching voltage when switching a target power value, which is a standard of switching from the section 2 to the section 3, is the second voltage value V2. This switching voltage is a predetermined voltage value resulting from a state change of the halogen cycle, which will be described later. For example, this switching voltage is a voltage value at which a temperature in a discharge space is supposed to be beyond a predetermined temperature range in which the halogen cycle properly functions (which includes a case in which the temperature is actually beyond the predetermined range).

On the other hand, the lamp 31, whose discharge is maintained by the constant power control in the section 3, is constant power controlled at the second power value W2 that is lower than the first power value W1 in the section 2, and a temperature in a discharge space is lower than a temperature in the constant power control in the section 2.

3. Lighting Apparatus (1) Structure

Figure 5:
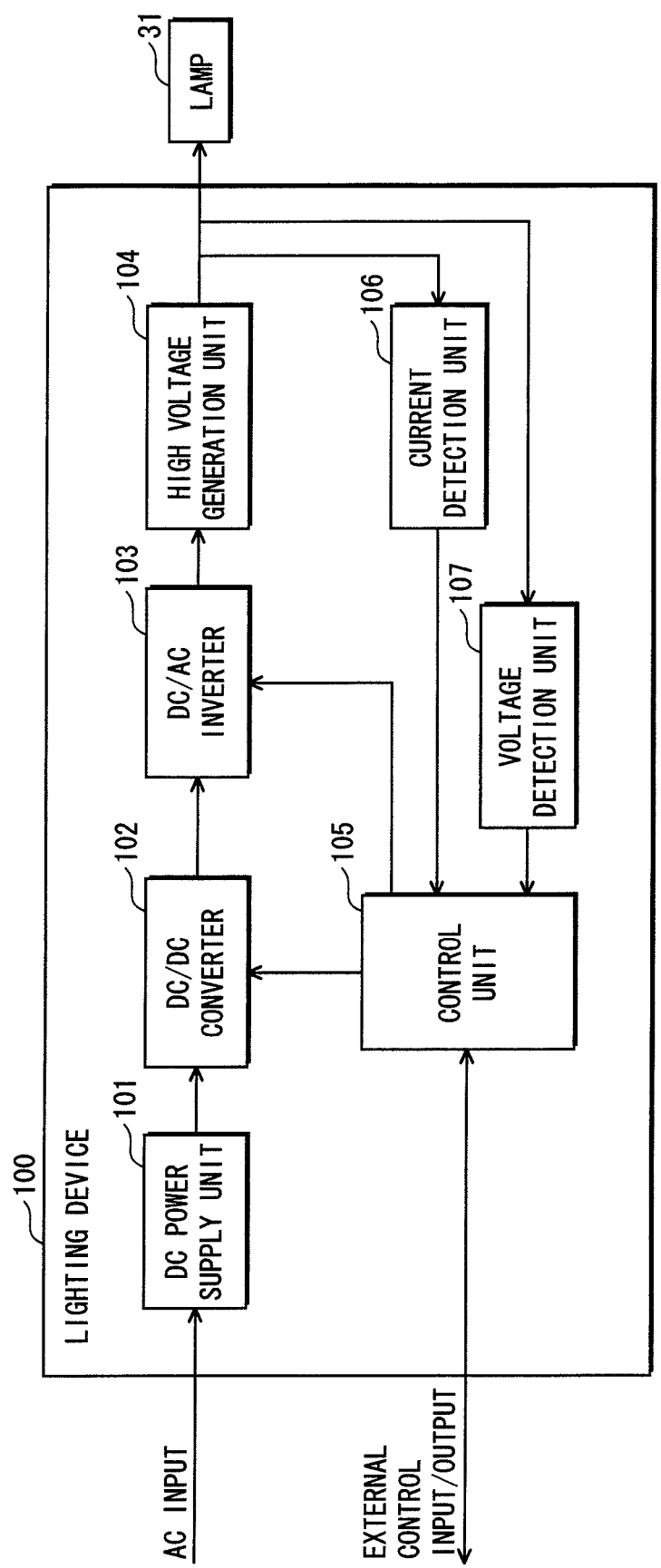
FIG. 5 is a block diagram showing a lighting apparatus for lighting up a lamp.

FIG. 5 is a block diagram showing a lighting apparatus for lighting up the lamp. As shown in FIG. 5, a lighting apparatus 100 includes a DC power supply unit 101, a DC/DC converter 102, a DC/AC inverter 103, a high voltage generation unit 104, a control unit 105, a current detection unit 106, and a voltage detection unit 107.

The DC power supply unit 101 generates a DC voltage from a household AC voltage of 100 V, and supplies the DC voltage to the DC/DC converter 102.

The DC/DC converter 102 converts the DC voltage supplied from the DC power supply unit 101 to a predetermined DC voltage based on a power setting signal (which will be described later) received from the control unit 105, and supplies the converted DC voltage to the DC/AC inverter 103.

The DC/AC inverter 103 generates an alternating rectangular current of a predetermined frequency from the supplied DC voltage, and applies the generated alternating rectangular current to the lamp 31. The high voltage generation unit 104 generates a high voltage pulse, for example, which is required to cause the lamp 31 to start a discharge.

The current detection unit 106 detects a current corresponding to a current passing through the lamp 31 (hereinafter, referred to as "lamp current"), and transmits a result of the detection to the control unit 105. The voltage detection unit 107 detects a voltage corresponding to a voltage applied to the lamp 31 (hereinafter, referred to as "lamp voltage"), and transmits a result of the detection to the control unit 105.

The control unit 105 lights up the lamp 31 according to the control characteristics shown in FIG. 4, and maintains a discharge of the lamp 31. More specifically, the control unit 105 stores a table showing the control characteristics shown in FIG. 4, and according to the table, adjusts a power which is supplied to the lamp 31 based on the current detected by the current detection unit 106 and the voltage detected by the voltage detection unit 107.

(2) Control Content

Figure 6:
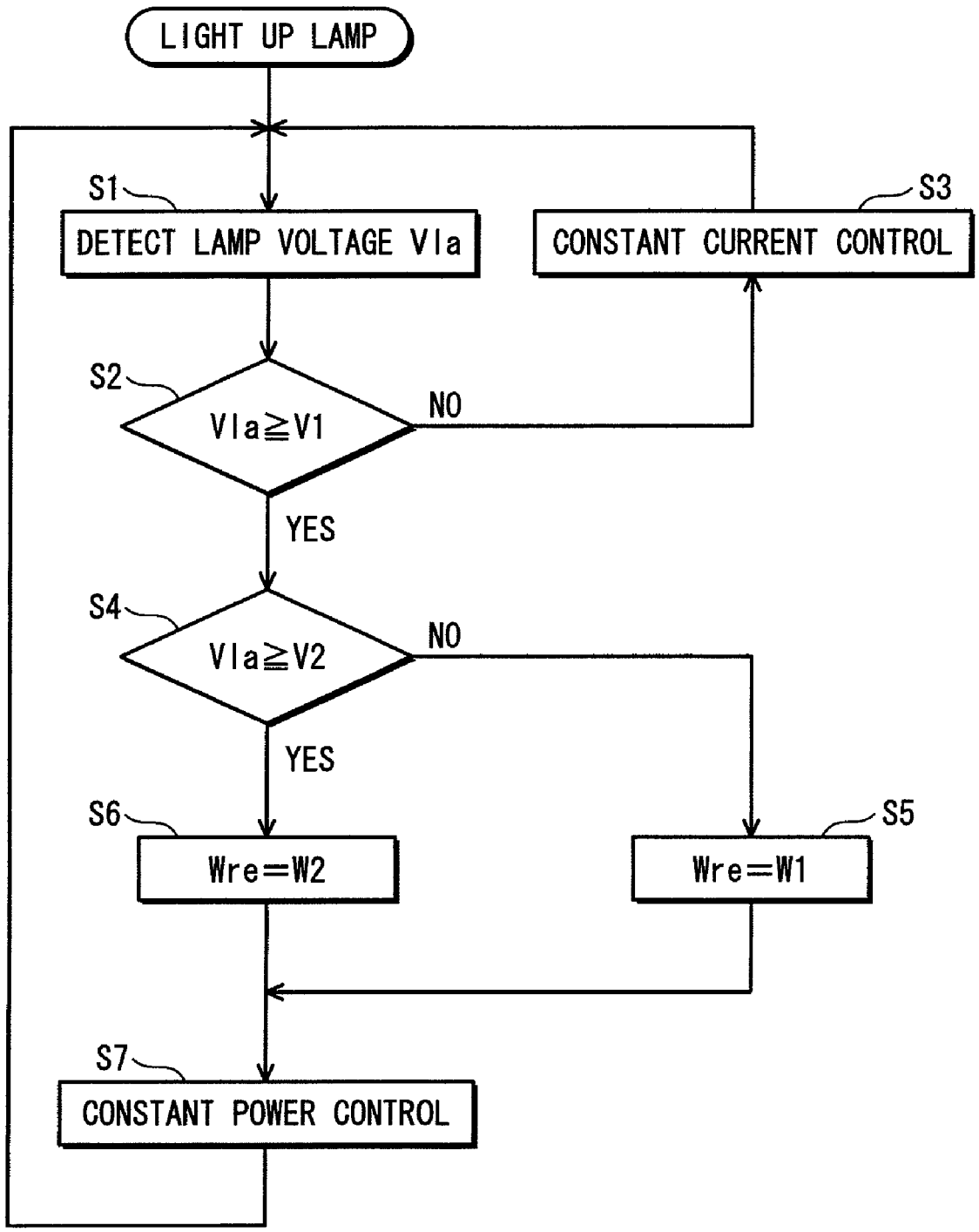
FIG. 6 is a flowchart showing a lighting control of the lamp of the embodiment.

FIG. 6 is a flowchart showing a lighting control of the lamp of the embodiment.

Firstly, the lighting apparatus 100 starts lighting up the lamp 31, and then detects the lamp voltage Vla in a step S1. More specifically, the lamp voltage Vla is detected by the voltage detection unit 107. The control unit 105 judges whether or not a value of the detected lamp voltage Vla is equal to or higher than the first voltage value V1 (step S2).

When the value of the lamp voltage Vla is lower than the first voltage value V1 ("NO" in the step S2), the control unit 105 performs the constant current control in the section 1 in FIG. 4 (step S3). On the other hand, when the value of the lamp voltage Vla is equal to or higher than the first voltage value V1 ("YES" in the step S2), the processing goes to a step S4, and the control unit 105 judges whether or not the value of the lamp voltage Vla is equal to or higher than the second voltage value V2. Note that in the step S3, the control unit 105 instructs the DC/DC converter 102 and the DC/AC inverter 103 to output predetermined voltage and current in order to perform the constant current control.

When the value of the lamp voltage Vla is lower than the second voltage value V2 ("NO" in the step S4), the control unit 105 sets a target power value Wre to the first power value W1 to perform the constant power control in the section 2 in FIG. 4 (step S5). Then, the processing goes to a step S7, and the control unit 105 performs the constant power control at the first power value W1 as a target power value (this control corresponds to the constant power control in the section 2).

On the other hand, when the value of the lamp voltage Vla is equal to or higher than the second voltage value V2 ("YES" in the step S4), the control/unit 105 sets the target power value Wre to the second power value W2 to perform the constant power control in the section 3 in FIG. 4 (step S6). Then, the processing goes to the step S7, and the control unit 105 performs the constant power control at the second power value W2 as the target power value (this control corresponds to the constant power control in the section 3).

After the control unit 105 instructs the DC/DC converter 102 and the DC/AC inverter 103 to output the predetermined voltage and current in order to perform the constant current control in the step S7, the processing goes back to the step S1.

4. Comparison Test

Next, a lighting test was performed to compare a case in which a discharge of a lamp is maintained by the lighting method of the present invention, i.e. a method of switching a target power value (hereinafter, also referred to as "method of switching a power") with a case in which a discharge of a lamp is maintained by a method of fixing a target power value without switching (hereinafter, also referred to as "method of fixing a power").

In the lighting test here, the following cycle is repeated. In the cycle, after the lamp has been turned on for 3.5 hours, the lamp is turned off, and when a turn-off time reaches 0.5 hours, the lamp is turned on again. Also, an accumulated time, in which a discharge of the lamp is maintained, is defined as an accumulated operating time.

(1) Specification of Lamp

The lamp 31 used in this lighting test is considered to be used as, for instance, a liquid crystal projector, and thus will be described accordingly. The lamp 31 has a rated lamp power of 120 W, and is a so-called "short arc" type lamp, where a gap (a distance between the electrodes) is set in a range of 0.5 (mm) to 2.0 (mm), in order to make the lamp closer to a point source of light.

Mercury that is a light-emitting material is enclosed in a range of 0.15 (mg/mm$^3$) to 0.35 (mg/mm$^3$) of an internal volume of the discharge space. As a starting gas, a rare gas such as argon, krypton, or xenon is used, and is enclosed at an enclosing pressure of 100 (mbar) to 400 (mbar) when the lamp is cooled.

Also, as a halogen compound, bromine or iodine is used, for example, and is enclosed in a range of $1\times10^{-7}$ (μmol/mm$^3$) to $1\times10^{-2}$ (μmol/mm$^3$).

Note that when a numerical range is represented as "a to b", the range is inclusive of the lower limit "a" and the upper limit "b".

(2) Lighting Method 2-1) Lighting by a Method of Fixing a Target Power Value

When a value of the lamp voltage Vla at which the lamp starts to be lighted up is equal to or lower than the first voltage value V1, a discharge of a lamp is maintained by the constant current control in the section 1 in FIG. 4, so that a lamp current value is 2.5 (A). Here, the first voltage value V1 is 48 (V).

When the value of the lamp voltage Vla increases to the first voltage value V1 (the lamp power Wla is the first power value W1, and is 120 (W) at this time), the lamp power Wla is maintained, and a discharge of the lamp is maintained by the constant power control in the section 2 in FIG. 4, which is performed at the first power value W1 as a target power value. Note that the first voltage value V1 is, in other words, a voltage value of the lamp voltage Vla at which the lamp power Wla reaches a rated lamp power.

2-2) Lighting by a Method of Switching a Target Power Value

In the lighting method that has the control characteristics shown in FIG. 4, the first voltage value V1 is 48 (V), and the first power value W1 is 120 (W). Also, the second voltage value V2 is 86 (V), and the second power value W2 is 110 (W), which are characterizing portions of this method.

When the value of the lamp voltage Vla at which the lamp starts to be lighted up is equal to or lower than the first voltage value V1, the discharge of the lamp is maintained by the constant current control in the section 1 in FIG. 4, so that a lamp current value is 2.5 (A). When the value of the lamp voltage Vla increases to the first voltage value V1 (the lamp power Wla is the first power value W1, and is 120 (W) at this time), the lamp power Wla is maintained, and the discharge of the lamp is maintained by the constant power control in the section 2 in FIG. 4, which is performed at the first power value W1 as a target power value. Note that the maintenance of the discharge of the lamp from the start of lighting up of the lamp to this point is same as the lighting up of the lamp by the method of fixing a target power value.

When the value of the lamp voltage Vla further increases and reaches the second voltage value V2 (86 (V)), the discharge of the lamp is maintained by the constant power control in the section 3 in FIG. 4, in which the target power value is reduced to the second power value W2.

(3) Comparison Result

Figure 7:
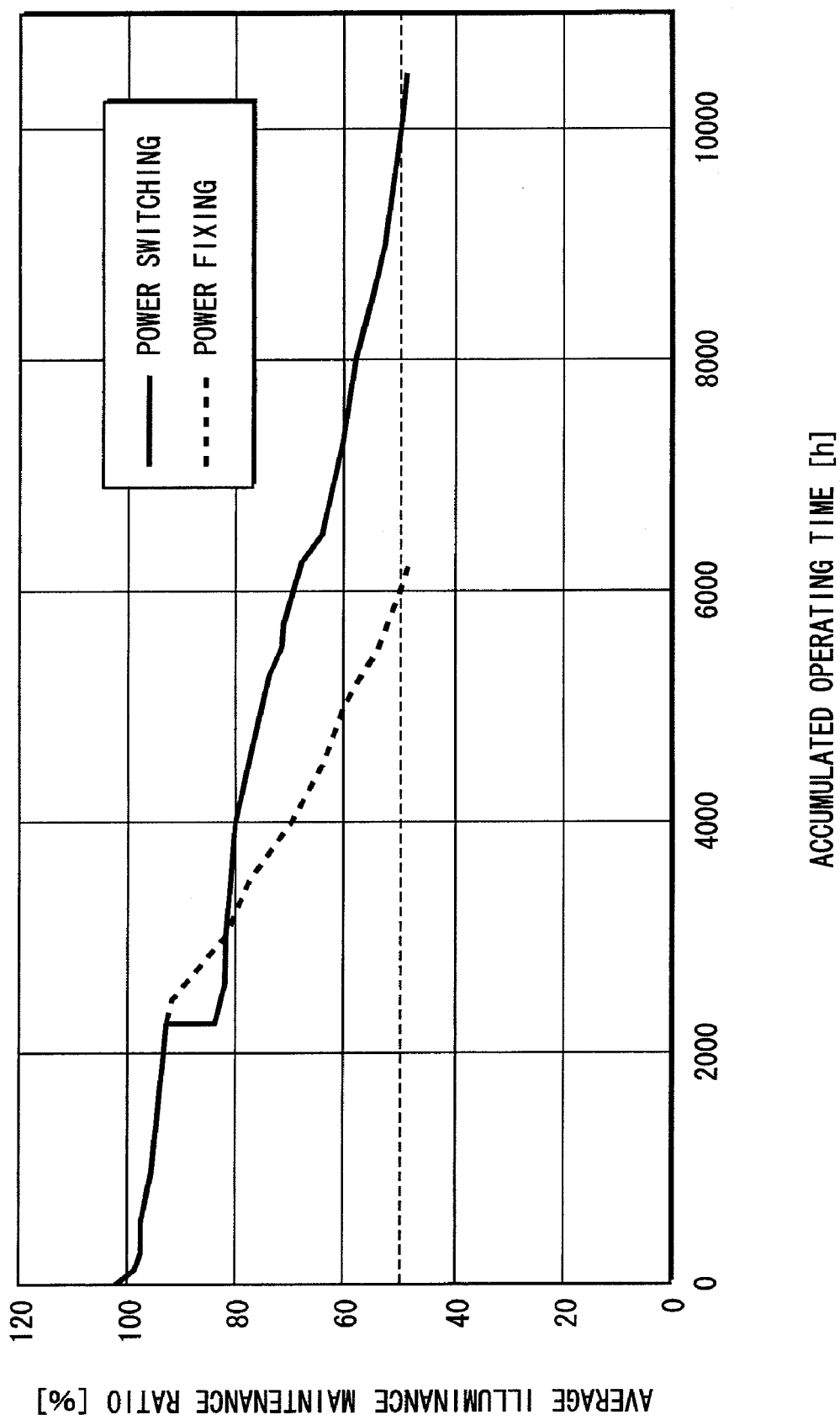
FIG. 7 shows a result of a comparison test.

FIG. 7 shows a result of the comparison test. Note that a full line in FIG. 7 ("power switching" in FIG. 7) indicates a result by the method of switching a target power value, and a broken line in FIG. 7 ("power fixing" in FIG. 7) indicates a result by the method of fixing a target power value.

In this method, when an average illuminance maintenance ratio (%) reaches 50(%), the test is to be ended on the supposition that the lamp being tested comes to the end of its life. With regard to illuminance, emission of light from the lamp 31 was projected on a 50-inch screen using an optical system, and an illuminance at the center of the screen was measured.

From FIG. 7, it is proved that the average illuminance maintenance ratio reaches 50 (%) when an accumulated operating time is about 6,000 hours, in the lighting method of fixing a target power value at 120 (W). On the other hand, the average illuminance maintenance ratio reaches 50(%) when an accumulated operating time is about 10,000 hours, in the lighting method of switching a target power value.

As mentioned above, if the lamp is lighted up and the discharge of the lamp is maintained by the method of switching the target power value of the present invention, compared with a case in which the lamp is lighted up by the method of fixing the target power value without switching, a period of time from when the lamp is lighted up to when the average illuminance maintenance ratio reaches 50(%) (a period of time from when the lamp is lighted up to when the lamp comes to the end of its life) is extended by about 4,000 hours, and the accumulated operating time becomes about 1.67 times longer. Therefore, it is proved that a life of the lamp can be considerably extended by switching (reducing) the target power value while the discharge of the lamp is maintained.

This is because of the following reason. In the lighting method of fixing the target power value, when the accumulated operating time of the lamp becomes longer, a state of the halogen cycle deviates from a proper state. Because a discharge of the lamp is maintained after the deviation, devitrification and blackening occur in a discharge vessel, an amount of emission of light from the lamp is reduced, and the lamp comes to the end of its life at an early stage.

On the other hand, in the lighting method of switching the target power value of the present invention, even if the accumulated operating time of the lamp becomes longer, the control is switched to the constant power control in which the target power value is reduced, when a state of the halogen cycle deviates from the proper state, or immediately after the state of the halogen cycle deviates from the proper state, i.e. when a temperature in a discharge space is beyond a proper temperature range of the halogen cycle, or immediately after the temperature in the discharge space is beyond the proper temperature range of the halogen cycle. Therefore, the halogen cycle maintains the proper state, and thus tungsten evaporated from an electrode is less likely to be adhered to a tube wall of the discharge vessel, and is accumulated in the electrode again because of the halogen cycle. As a result, a reduction of an illuminance due to devitrification and blackening can be suppressed, and the lamp has a longer life.

5. Timing of Switching a Power

The following describes a timing of switching a target power value.

It is known that a life of a lamp can be extended by enclosing a halogen compound in a discharge space and using a function of the halogen cycle effectively.

On the other hand, it can be judged whether or not the halogen cycle is in a proper state based on a distance between electrodes or a temperature in a discharge space. Therefore, in order to light up a lamp in the proper state of the halogen cycle, the temperature in the discharge space, for example, is detected, and if the temperature is likely to be beyond a proper temperature range of the halogen cycle, by shifting a target power value during a constant power control to a smaller power value, a subsequent constant power control may be continuously performed at the smaller power value.

However, it is difficult to detect the temperature in the discharge space while a discharge of a lamp is maintained. Therefore, the following temperature can be used as a substitute for "the temperature in the discharge space". When the lamp 31 is lighted up with a longitudinal direction thereof situated substantially horizontally, a temperature in the highest position in a surface of the discharge vessel 43 of the lamp 31, i.e. a temperature in a top position in a surface of the light emitting part 37 (hereinafter, referred to as "temperature in a discharge vessel") may be used. Even if each lamp has a different rated power, a size of a discharge vessel or the like is generally designed so that a temperature in a discharge space is substantially same.

Meanwhile, it is difficult to apply the detection of the temperature in the discharge vessel to an actual lighting apparatus, because a surface temperature of the discharge vessel while a discharge of a lamp is maintained is high, a sensor for detecting the temperature is very expensive, and a lighting method becomes complicated.

Therefore, the inventors proceeded an investigation and consideration with regard to a method which can figure out a timing at which the temperature in the discharge space is beyond a proper temperature range of the halogen cycle, using characteristics relating to the lamp instead of the temperature in the discharge space (temperature in the discharge vessel).

By repeating various experiments and the like, the inventors found that the timing at which the temperature in the discharge space (temperature in the discharge vessel) is beyond the proper temperature range of the halogen cycle, i.e. a timing at which a state of the halogen cycle changes can be figured out from the lamp voltage Vla.

Figure 8:
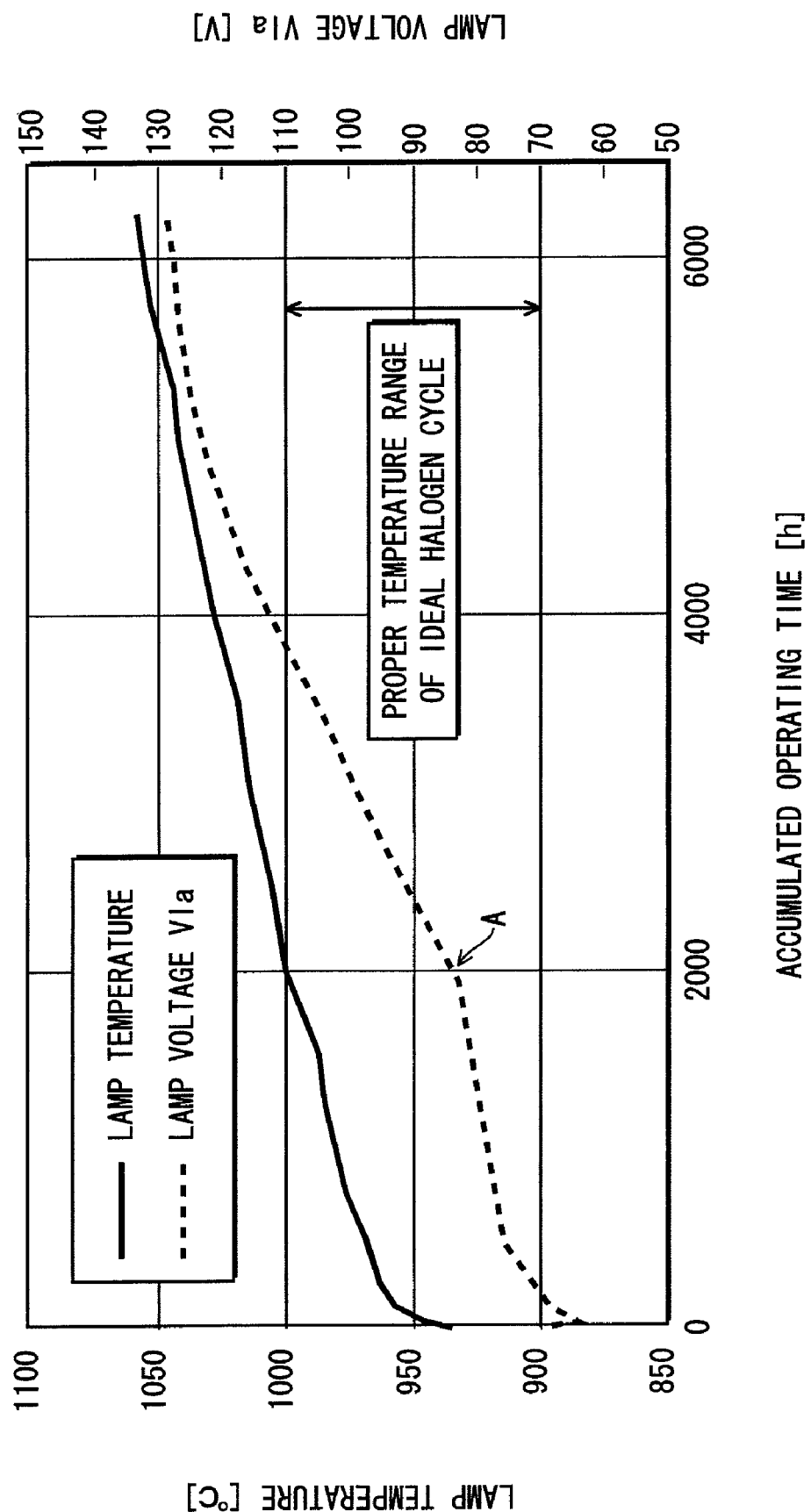
FIG. 8 shows a relation between an accumulated operating time and a lamp temperature, and a relation between the accumulated operating time and a lamp voltage in the embodiment.

FIG. 8 shows a relation between the accumulated operating time and the lamp temperature, and a relation between the accumulated operating time and the lamp voltage Vla in the embodiment.

As shown in FIG. 8, as the accumulated operating time becomes longer, the lamp temperature and the lamp voltage Vla increase. It can be observed that when the lamp temperature is beyond the proper temperature range of the halogen cycle (950(° C.)±50(° C.), i.e. in a range of 900(° C.) to 1000(° C.)), a slope of an increase of the lamp voltage Vla changes ("A" in FIG. 8). In detail, it can be found that the slope of the increase of the lamp voltage Vla changes in the vicinity of a point where the accumulated operating time reaches about 2,000 hours.

Since the lamp temperature is within the proper temperature range of the halogen cycle until the point where the accumulated operating time reaches about 2,000 hours, the halogen cycle effectively functions and electrode consumption is reduced. Therefore, the lamp voltage Vla gradually increases as the accumulated operating time increases.

On the other hand, when the accumulated operating time exceeds 2,000 hours, the lamp temperature is beyond the proper temperature range of the halogen cycle, and thus the halogen cycle does not effectively function. As a result, an amount of tungsten which is evaporated from an electrode and goes back to the electrode again is reduced, and an amount of tungsten which is evaporated from an electrode and adhered to a tube wall of a discharge vessel is increased. Thus, the electrode is considerably consumed, an increase of the lamp voltage Vla after the accumulated operating time exceeds 2,000 hours becomes larger than an increase of the lamp voltage Vla until the point where the accumulated operating time reaches about 2,000 hours.

Therefore, as shown in FIG. 8, if a point ("A" in FIG. 8) where the slope of the increase of the lamp voltage Vla changes can be recognized, the timing at which the lamp temperature is beyond the proper temperature range of the halogen cycle can be figured out.

Note that in a lamp having a rated lamp power of 120 W, a lamp voltage value at which a slope of the lamp voltage changes is about 86 (V). In the lighting method of switching a target power value, a lamp having about 1.6 times longer life can be obtained compared with a life of a lamp which is lighted up by the lighting method of fixing a target power value.

6. Comparison with Conventional Technology

Figure 9:
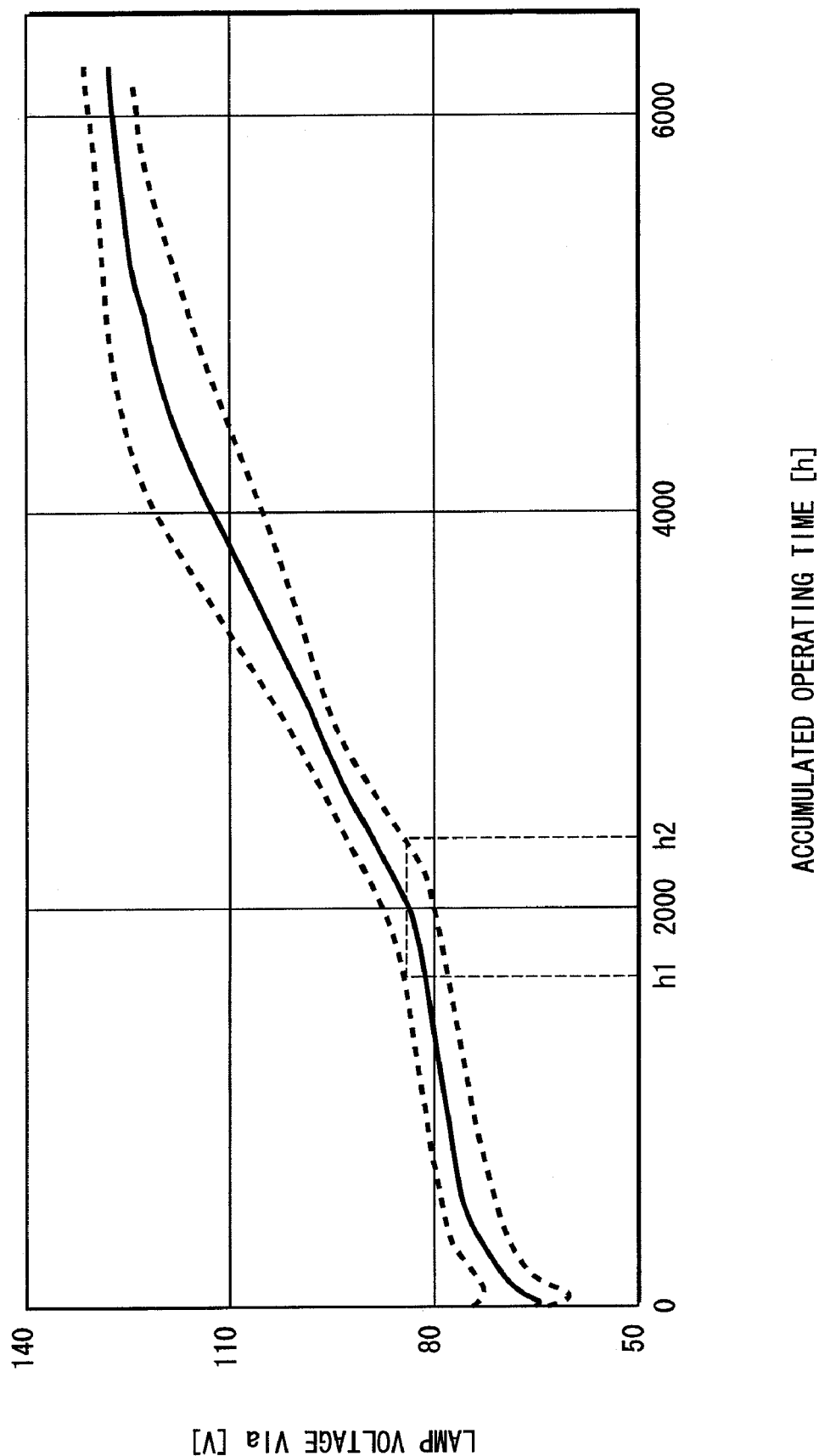
FIG. 9 shows a relation between an accumulated operating time and a lamp voltage Vla in a lamp having a rated lamp power of 120 W.

FIG. 9 shows a relation between the accumulated operating time and the lamp voltage Vla in the lamp having a rated lamp power of 120 W.

In FIG. 9, five lamps each having the same specification are used, and an upper limit and a lower limit of dispersion are shown by broken lines.

As described above, the lamp voltage at which a state of the halogen cycle changes is 86 (V), and the accumulated operating time during which the lamp voltage Vla reaches 86 (V)

is as follows. In a case of a lamp having a shortest time to reach 86 (V), the accumulated operating time is about 1,650 hours, and in a case of a lamp having a longest time to reach 86 (V), the accumulated operating time is about 2,350 hours. Therefore, a difference between these lamps is about 700 hours. In the conventional method in which the target power value is reduced when the accumulated operating time reaches a predetermined time, conditions for maintaining discharges of individual lamps are different as mentioned above. Thus, it is hard to say that the target power value is reduced at a proper timing with regard to each individual lamp.

Compared with this, in the lighting method of the present invention, when a voltage value of a lamp, which is being lighted up, reaches a predetermined voltage value which has been obtained by an experiment and the like, a target power value is reduced. Therefore, the target power value can be reduced at a proper timing with regard to each individual lamp. In other words, referring to FIG. 9, in the case of the lamp whose lamp voltage Vla reaches 86 (V) when the accumulated operating time is 1,650 hours, the target power value is switched when the accumulated operating time is about 1,650 hours, and in the case of the lamp whose lamp voltage Vla reaches 86 (V) when the accumulated operating time is 2,350 hours, the target power value is switched when the accumulated operating time is 2,350 hours. As a result, the target power value can be switched in correspondence with each individual lamp.

<Modification>

Up to now, the present invention has been described specifically through the embodiment. However, the technical scope of the present invention is not limited to the above-described embodiment. For example, the following are modifications.

1. Lamp

In the above embodiment, the case in which the lighting method (lighting apparatus) of the present invention is applied to the lamp having a rated lamp power of 120 (W) has been described. However, the lighting method (lighting apparatus) of the present invention may be applied to a lamp having other rated lamp power. The following describes a case in which the present invention is applied to a lamp having a rated lamp power of 200 (W) as a first modification.

Figure 10:
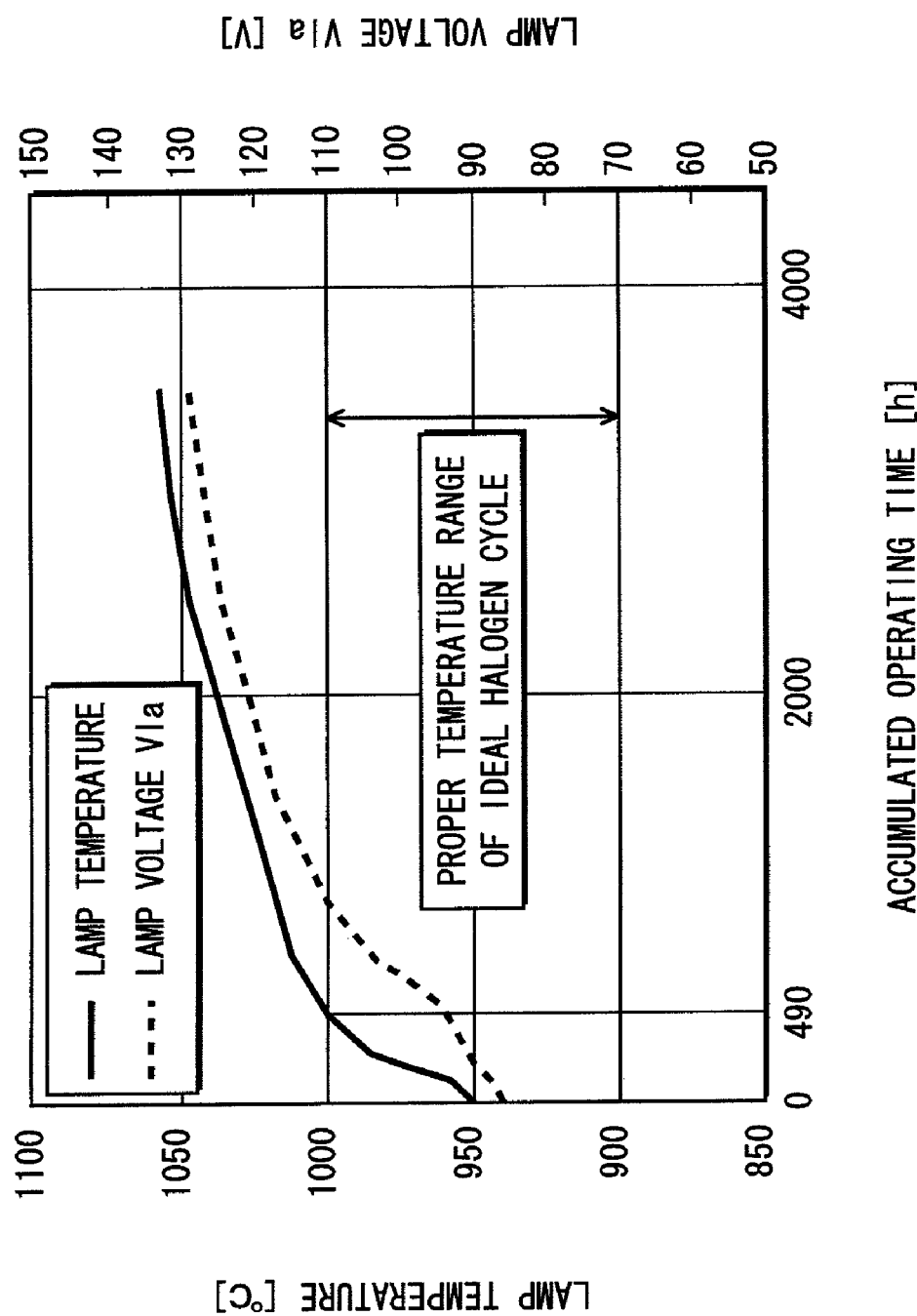
FIG. 10 shows a relation between an accumulated operating time and a lamp temperature, and a relation between the accumulated operating time and a lamp voltage in a first modification.

FIG. 10 shows a relation between an accumulated operating time and a lamp temperature, and a relation between the accumulated operating time and a lamp voltage in the first modification.

As shown in FIG. 10, it is found from the relation between the accumulated operating time and the lamp voltage Vla that, the lamp voltage Vla tends to increase as the accumulated operating time passes, same as FIG. 8 in the embodiment. Also, a slope of an increase of the lamp voltage Vla changes when the accumulated operating time is about 490 hours. As can be seen from FIG. 10, when the accumulated operating time is 490 hours, the lamp temperature is about 1,000(° C.) which is an upper limit of the proper temperature range of the halogen cycle. Note that when the accumulated operating time is about 490 hours, the lamp voltage Vla is about 96 (V).

Therefore, it is proved from FIG. 10 that a timing at which the slope of the increase of the lamp voltage Vla changes is a substantial timing at which the lamp temperature is beyond the proper temperature range of the halogen cycle.

The following describes a case in which the lamp having a rated lamp power of 200 (W) is lighted up by the lighting method of the present invention using the above result.

Figure 11:
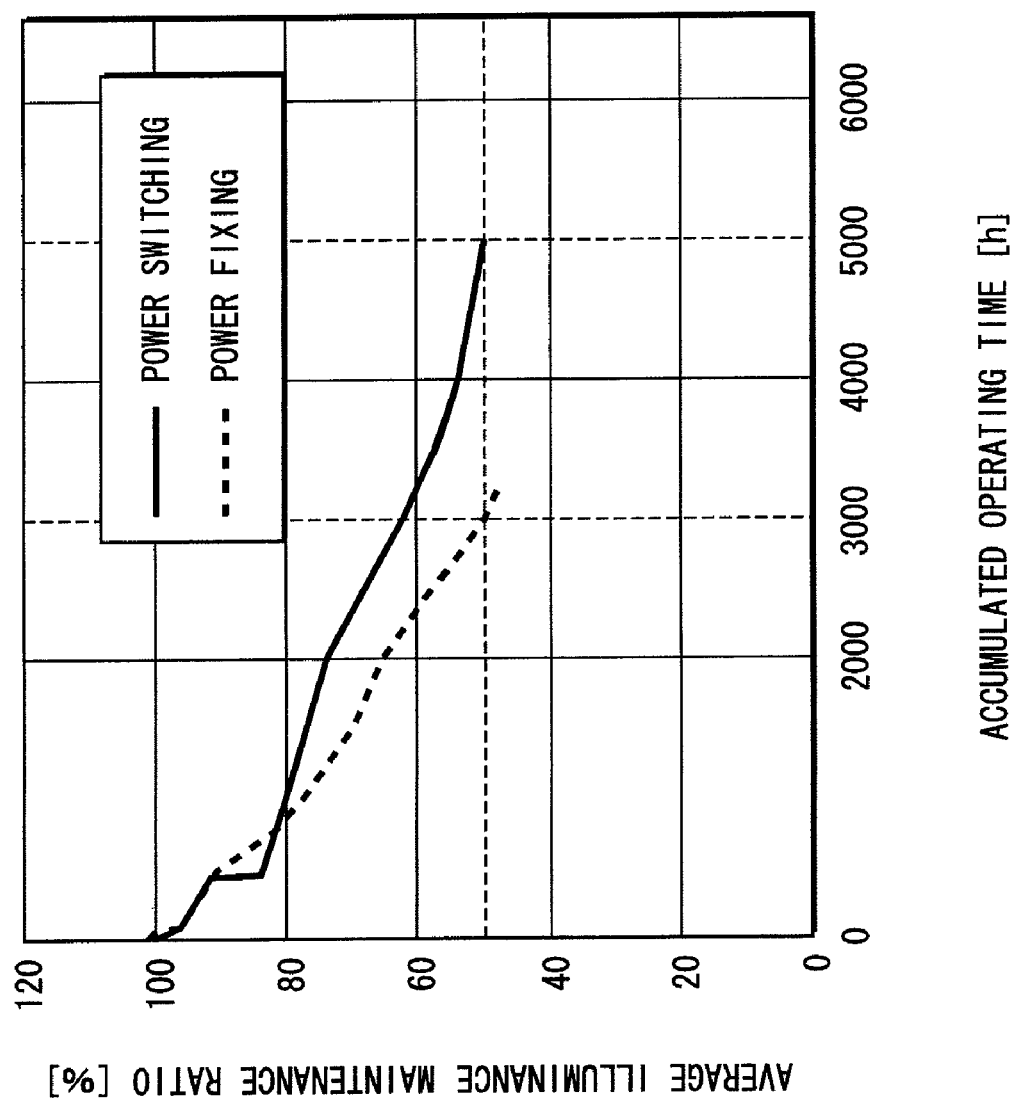
FIG. 11 shows a result of a lighting test using a lamp having a rated lamp power of 200 W in the first modification.

FIG. 11 shows a result of a lighting test using the lamp having a rated lamp power of 200 (W) of the first modification.

It is found from FIG. 11 that, in a lighting method of fixing a target power value at 200 (W), when an accumulated operating time is about 3,000 hours, an average illuminance maintenance ratio reaches 50(%). On the other hand, in a lighting method of reducing a target power value from 200 (W) to 180 (W) when the lamp voltage reaches about 96 (V) and continuously performing a subsequent constant power control at the target power value 180 (W), when an accumulated operating time is about 5,000 hours, an average illuminance maintenance ratio reaches 50(%).

As mentioned above, if the lamp is lighted up by the method of switching a target power value when the lamp voltage Vla reaches a predetermined value due to a state change of the halogen cycle, compared with a case in which the lamp is lighted up by the method of fixing a target power value without switching, a period of time from when the lamp is lighted up to when the average illuminance maintenance ratio reaches 50(%) is extended by about 2,000 hours, and the accumulated operating time becomes about 1.67 times longer.

This indicates that the lighting method (lighting apparatus) of the present invention can be applied to any high-pressure mercury lamp regardless of a rated lamp power. However, in order to switch a power, it is required at least to test a change with time of a lamp voltage and figure out a value of the lamp voltage at which a slope thereof changes.

2. Switching of a Target Power Value

In the embodiment, the target power value of the constant power control is switched once (when "n" is 2 in the present invention). In other words, the target power value is switched once from the section 2 to the section 3 in FIG. 4. However, in the lighting method and the lighting apparatus of the present invention, the number of switching times is not limited to once, and the target power value can be switched more than once. The following describes a case in which the target power value is switched three times (when "n" is 4 in the present invention) as a second modification.

It is required to test a change with time of a lamp voltage after switching and figure out a voltage value at which a slope thereof changes, even in the case in which the target power value is switched more than once.

(1) Control Characteristics in the Second Modification

Figure 12:
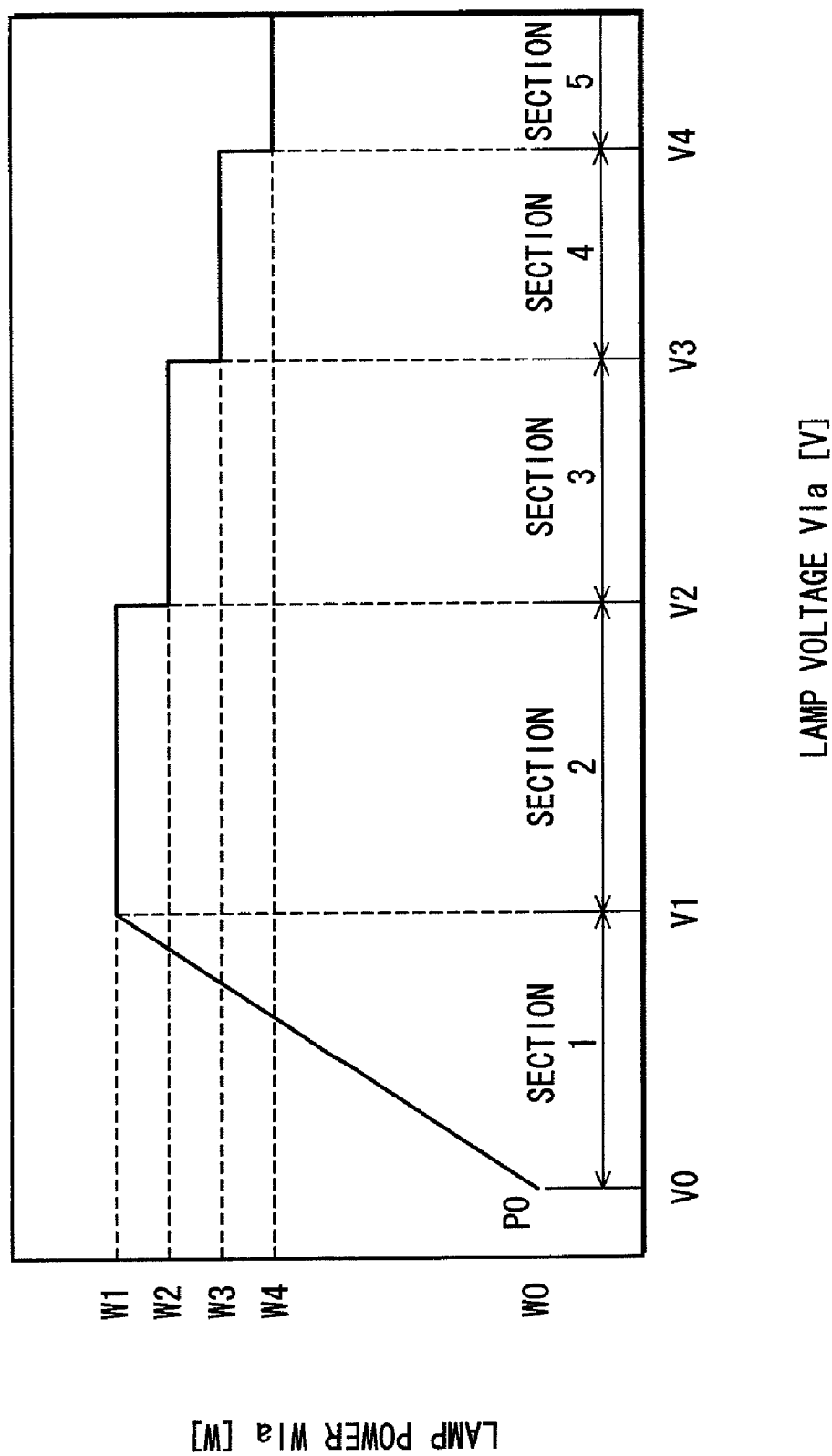
FIG. 12 is a diagram showing control characteristics of a high-pressure mercury lamp of a second modification.

FIG. 12 shows control characteristics of a high-pressure mercury lamp of the second modification, and is a correlation diagram between the lamp voltage Vla and the lamp power Wla supplied after generating a breakdown by applying a high-voltage pulse to a lamp, same as in the embodiment. Note that the control characteristics are performed by a control unit which will be described later.

As shown in FIG. 12, in a lighting method of the second modification, a constant current control is performed in a section 1, and a constant power control is performed in each of sections 2 to 5. A range of the lamp voltage Vla in each of the sections is as follows. The lamp voltage Vla in the section 1 is in a range of equal to or higher than an initial voltage value V0 but lower than a first voltage value V1, the lamp voltage Vla in the section 2 is in a range of equal to or higher than the first voltage value V1 but lower than a second voltage value V2, the lamp voltage Vla in the section 3 is in a range of equal to or higher than the second voltage value V2 but lower than a third voltage value V3, the lamp voltage Vla in the section 4 is in a range of equal to or higher than the third voltage value V3 but lower than a fourth voltage value V4, and the lamp voltage Vla in the section 5 is in a range of equal to or higher than the fourth voltage value V4.

Because the sections 1 and 2 are same as in the embodiment, the explanations thereof are omitted, and the sections 3 to 5 will be described here.

1-1) Switching from the Section 2 to the Section 3

A target power value in the constant power control in the section 2 is a first power value W1. When the lamp voltage Vla increases while a discharge of a lamp is maintained and reaches the second voltage value V2, the target power value is reduced from the first power value W1 to a second power value W2. After that, a subsequent constant power control is performed at the second power value W2 as the target power value until the lamp voltage Vla reaches the third voltage value V3.

1-2) Switching from the Section 3 to the Section 4

A target power value in the constant power control in the section 3 is the second power value W2. When the lamp voltage Vla increases while the discharge of the lamp is maintained and reaches the third voltage value V3, the target power value is reduced from the second power value W2 to a third power value W3. After that, the constant power control is performed at the third power value W3 as the target power value until the lamp voltage Vla reaches the fourth voltage value V4.

1-3) Switching from the Section 4 to the Section 5

A target power value in the constant power control in the section 4 is the third power value W3. When the lamp voltage Vla increases while the discharge of the lamp is maintained and reaches the fourth voltage value V4, the target power value is reduced from the third power value W3 to a fourth power value W4. After that, the constant power control is performed at the fourth power value W4 as the target power value.

1-4) Other

In the second modification, the target power value is switched based on the lamp voltage Vla, and when the lamp voltage Vla reaches a predetermined voltage value (n-th voltage value), the target power value is reduced (switched) to a predetermined power value (n-th power value).

This predetermined voltage value has been set due to a state change of the halogen cycle, same as in the embodiment. In FIG. 12, a target power value is switched three times, the number of target power values is four, and four types of constant power controls are performed (when "n" is 4 in the present invention).

(2) Control Content

Figure 13:
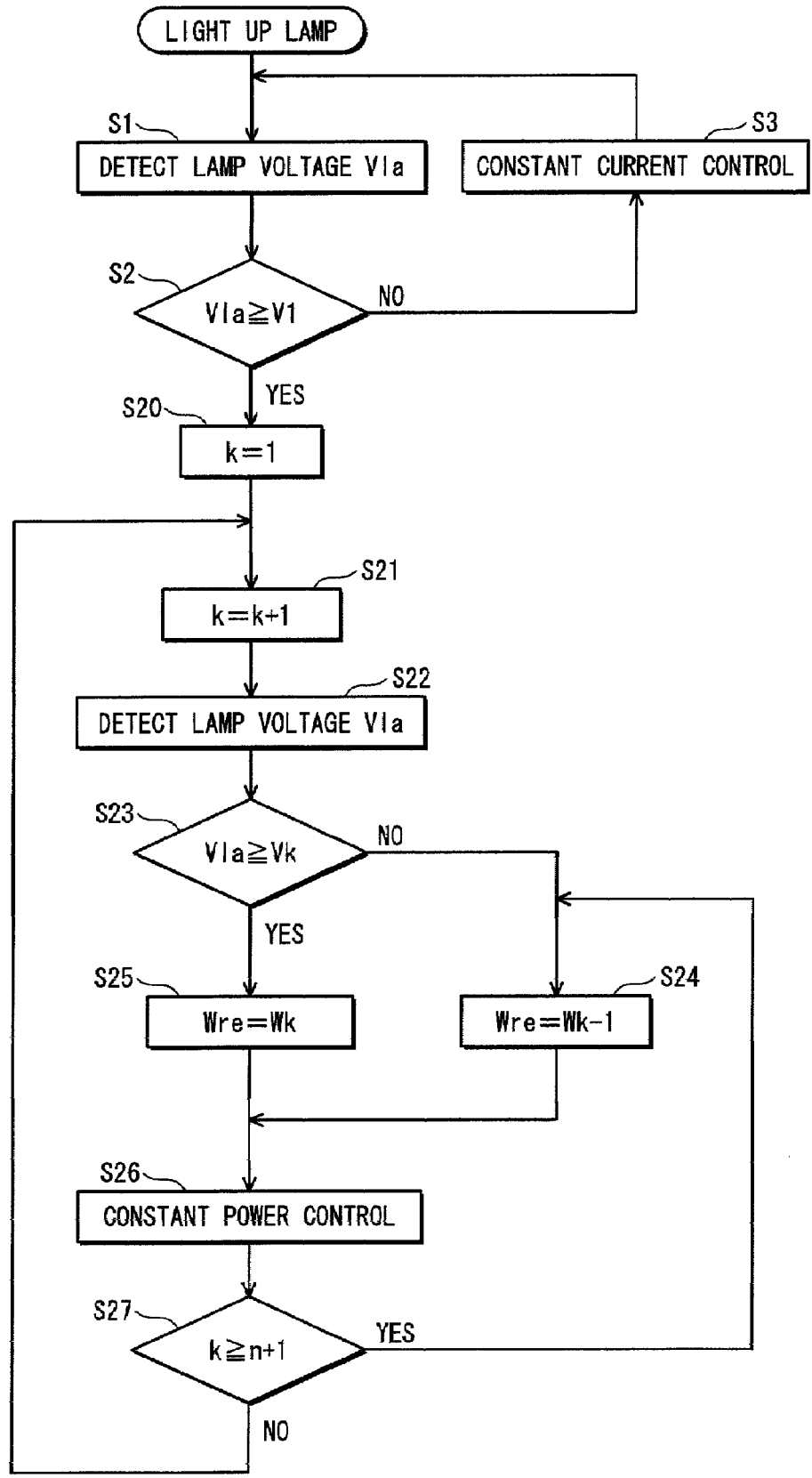
FIG. 13 is a flowchart showing a lighting control of a lamp of the second modification.

FIG. 13 is a flowchart showing a content of a lighting control of the lamp of the second modification.

A lighting apparatus of the second modification has substantially the same structure as the embodiment, but a content of processing performed by a control unit is different. Because the lighting apparatus of the second modification performs the same control as in the embodiment until the section 1 in FIG. 12, the same step numbers as the embodiment are used.

Firstly, when lighting up of the lamp starts, the lighting apparatus detects the lamp voltage Vla same as in the embodiment. The control unit judges whether or not a value of the detected lamp voltage Vla is equal to or higher than the first voltage value V1 (step S2).

When the value of the detected lamp voltage Vla is lower than the first voltage value V1 ("NO" in the step S2), the control unit performs the constant current control in the section 1 in FIG. 12 (step S3). On the other hand, when the value of the detected lamp voltage Vla is equal to or higher than the first voltage value V1 ("YES" in the step S2), the processing goes to a step S20.

The control unit of the second modification performs different processing from the embodiment after the step S20.

In the step S20, the control unit sets a variable "k", which indicates the number of switching times of a target power value, to "1". After that, the control unit adds "1" to the variable "k" in the next step S21. Then, the control unit detects the lamp voltage Vla in a step S22. Note that the detection method and the like are same as the step S1.

The following describes a case in which "k" is "2".

The control unit judges whether or not the value of the lamp voltage Vla detected in the step S22 is equal to or higher than the second voltage value V2 which has been set in advance (step S23).

When the value of the lamp voltage Vla is lower than the second voltage value V2 ("NO" in the step S23), the control unit sets a target power value Wre to the first power value W1 to perform the constant power control in the section 2 in FIG. 12 (step S24). Then, the processing goes to a step S26, and the control unit performs the constant power control at the first power value W1 as the target power value (this control corresponds to the constant power control in the section 2).

On the other hand, when the value of the lamp voltage Vla is equal to or higher than the second voltage value V2 ("YES" in the step S23), the control unit sets the target power value Wre to the second power value W2 to perform the constant power control in the section 3 in FIG. 12 (step S25). Then, the processing goes to the step S26, and the control unit performs the constant power control at the second power value W2 as the target power value (this control corresponds to the constant power control in the section 3).

Since the variable "k" is "2" and the number of switching times n is 3 in a step S27, "k" does not reach "n+1". Therefore, the processing goes back to the step S21. In this manner, the control unit judges whether or not the variable "k" is equal to or larger than the predetermined number of switching times "n+1", and when the variable "k" is smaller than the number of switching times "n+1", the processing goes back to the step S21. When the variable "k" is equal to or larger than the number of switching times "n+1", the processing goes back to the step S24. In detail, "1" is added to the variable "k" in the step S21 each time, and the steps S21 to S27 are repeated until the variable "k" reaches the number of switching times "n+1". When the variable "k" is equal to or lager than the number of switching times "n+1", the constant power control is performed at the power value which is set in the step S24.

Note that each of the number of switching times n, the k-th voltage value Vk, and the k-th power value Wk has been set by an experiment and the like, and stored in, for example, a storage unit in the lighting apparatus.

3. Switching Timing

It is assumed that the proper temperature range of the halogen cycle in the embodiment and the first modification is within a range of ±50(° C.) to an ideal temperature (950(° C.) in the lamp) at which the halogen cycle effectively functions (i.e. in a range of 900(° C.) to 1000(° C.)). In the embodiment and the first modification, a target power value in the constant power control is switched (reduced) in the vicinity of a point at which a lamp temperature is beyond the proper temperature range of the halogen cycle. However, the target power value may be switched in a later stage than the point (in a stage in which an accumulated operating time becomes longer).

In detail, in the embodiment and the first modification, based on a value of a lamp voltage at which a slope of an increase thereof changes in a change of the lamp voltage with time, when a value of the lamp voltage Vla reaches the above value of the lamp voltage at which a slope of an increase thereof changes while a discharge of the lamp is maintained, a target power value of the constant power control is switched. However, the target power value may be switched after the value of the lamp voltage Vla reaches the above value of the lamp voltage at which a slope of an increase thereof changes while the discharge of the lamp is maintained (for example, when the value of the lamp voltage Vla reaches a voltage value which is higher than the above value of the lamp voltage by a predetermined value).

4. Power in Switching

In the embodiment and the modifications, when a target power value of the constant power control is switched from the k-th power value (power value W1, for example) to the (k+1)-th power value (power value W2, for example), the lamp voltage remains constant. However, the target power value may be switched stepwise, or the target power value may be gradually reduced in accordance with an increase in a lamp voltage. Note that when a power value is switched stepwise, the number of switching times is not limited.

5. Reduced Amount of a Target Power Value

In the embodiment, the second power value W2 (W2=110 (W)) is about 92% of the first power value W1 (W1=120 (W)). However, the n-th power value of the present invention may be within a range of 80(%) to 95(%) of the (n−1)-th power value.

This is because of the following reason. If the n-th power value is higher than 95(%) of the (n−1)-th power value, an effect of reducing a target power value is lost. Conversely, if the n-th power value is lower than 80(%) of the (n−1)-th power value, a temperature in a discharge space becomes lower than a proper temperature of the halogen cycle, and it causes a short life of a lamp.

6. State Change of Halogen Cycle

In the embodiment, a lamp voltage, which has been set resulting from a deviation of a proper state of the halogen cycle, i.e. a state change of the halogen cycle, is a lamp voltage at which a lamp temperature is beyond a proper temperature range. However, the lamp voltage may be a lamp voltage at which a condition other than the lamp temperature deviates from the proper state of the halogen cycle.

As the condition other than the lamp temperature, a distance between electrodes can be used, for example. The distance between electrodes is substantially constant when the halogen cycle effectively functions. However, the distance between electrodes becomes larger, for example, when tungsten evaporated from the electrode is adhered to a wall surface of a discharge vessel.

It is known that the distance between electrodes has a one-to-one relationship with a lamp voltage. Therefore, a timing at which a state of the halogen cycle changes is identical to a timing at which the distance between electrodes starts changing. When the distance between electrodes starts changing, a change (slope) of the lamp voltage becomes larger. Thus, the state change of the halogen cycle can be judged by the lamp voltage Vla at which the distance between electrodes changes.

As mentioned above, the lamp voltage Vla changes in the constant power control when a discharge of the lamp is maintained, which is caused by the lamp temperature or the distance between electrodes (there may be other factors). However, it is eventually turned out that the lamp temperature becomes higher or the distance between electrodes becomes larger because the state of the halogen cycle changes.

7. Display Apparatus

Up to now, a front-projection type display apparatus has been described as a display apparatus including a lamp. However, the present invention can be also practicable in, for example, a rear-projection type display apparatus.

Figure 14:
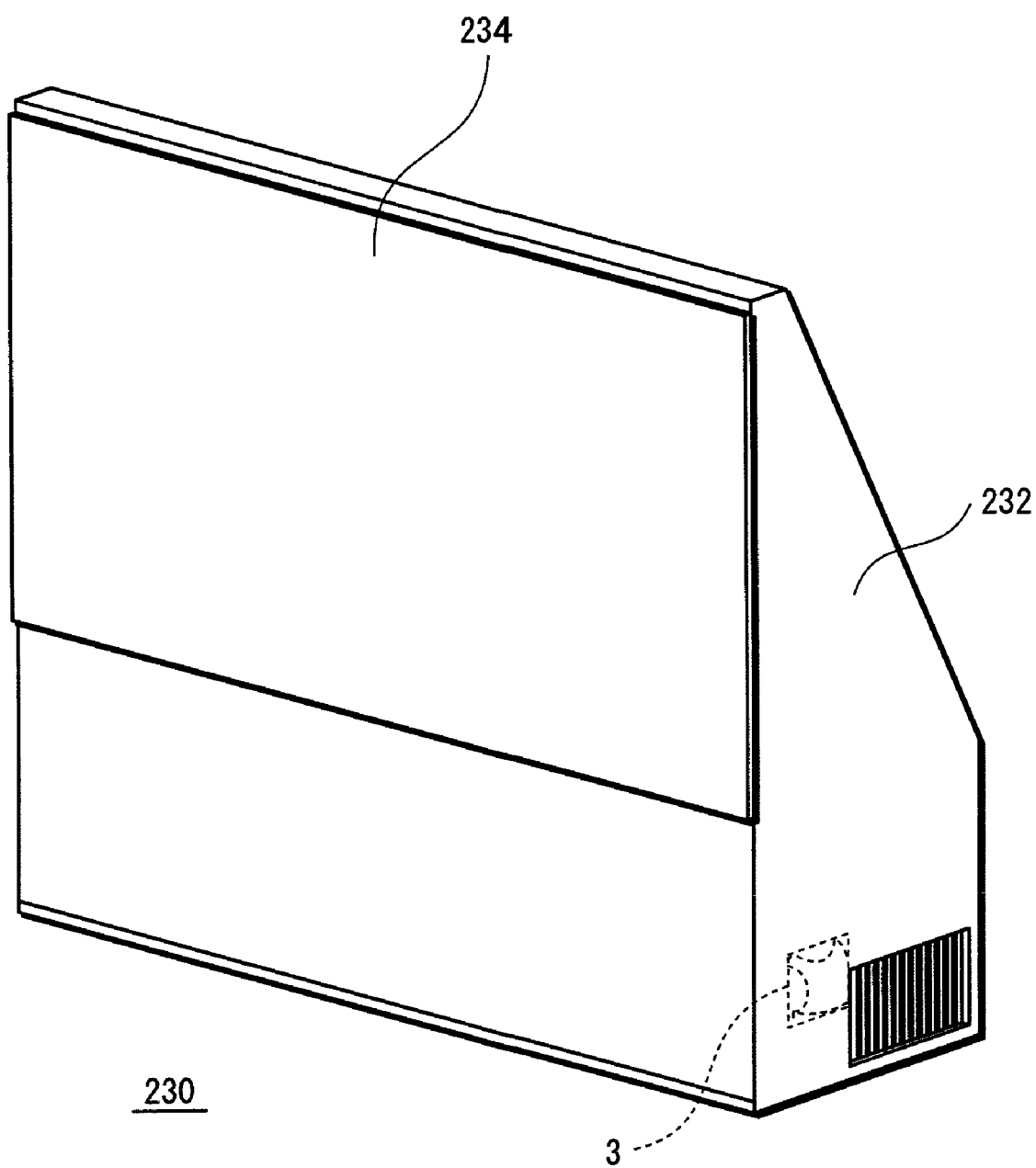
FIG. 14 is an overall perspective view of a rear-projection type display apparatus.

FIG. 14 is an overall perspective view of a rear-projection type display apparatus.

In the embodiment, the front-projection type projector has been described as mentioned above. However, a different type of projector other than the front-projection type, such as a rear-projection type projector shown in FIG. 14 may be applied.

A rear-projection type projector 230 includes a screen 234 that displays an image and the like on a front wall of a cabinet 232. The rear-projection type projector 230 also includes a power supply unit including the lighting apparatus, and the lamp unit 3 in the cabinet 232.

INDUSTRIAL APPLICABILITY

The present invention can be used for extending a life of each individual lamp using a halogen cycle effectively.

The invention claimed is:

1. A lighting method for operating a high-pressure mercury lamp that has a function of a halogen cycle, by performing a constant power control when a lamp voltage is equal to or higher than a predetermined voltage value, to maintain a discharge of the high-pressure mercury lamp, wherein when the lamp voltage increases resulting from a state change of the halogen cycle, a step of shifting a target power value of the constant power control from an immediately previous power value to a smaller power value is performed at least one time, and a subsequent constant power control is performed at the smaller power value as the target power value.

2. The lighting method of claim 1, wherein a range in which the lamp voltage is expected to be varied is divided into a plurality of voltage ranges, and a plurality of power values are set as the target power value in one-to-one correspondence with the voltage ranges, and when the lamp voltage reaches an n-th voltage range resulting from the state change of the halogen cycle, the target power value is shifted to an n-th power value corresponding to the n-th voltage range, where n is a natural number, and as n is larger, the voltage range is higher.

3. The lighting method of claim 2, wherein when the lamp voltage reaches the n-th voltage range resulting from the state change of the halogen cycle, a temperature in a position of the high-pressure mercury lamp is beyond a predetermined proper temperature range of the halogen cycle, the position being a top in a surface of a discharge vessel of the high-pressure mercury lamp operated with a longitudinal direction thereof situated substantially horizontally.

4. The lighting method of claim 2, wherein the high-pressure mercury lamp includes a pair of electrodes, and when the lamp voltage reaches the n-th voltage range resulting from the state change of the halogen cycle, a distance between the pair of electrodes is beyond a predetermined proper distance range.

5. The lighting method of claim 2, wherein
the n-th power value is in a range of 80% to 95% of an (n−1)-th power value.

6. The lighting method of claim 4, wherein
the n-th power value is in a range of 80% to 95% of an (n−1)-th power value.

7. The lighting method of claim 2, wherein
the target power value is shifted stepwise from an (n−1)-th power value to the n-th power value.

8. The lighting method of claim 6, wherein
the target power value is shifted stepwise from the (n−1)-th power value to the n-th power value.

9. A lighting apparatus for maintaining a discharge of a high-pressure mercury lamp that has a function of a halogen cycle, the lighting apparatus comprising:
   a lighting unit operable to, when a lamp voltage is equal to or higher than a predetermined voltage value, perform a constant power control at a predetermined power value as a target power value to maintain the discharge of the high-pressure mercury lamp; and
   a target power value switching unit operable to shift the target power value of the constant power control from an immediately previous power value to a smaller power value, when the lamp voltage increases resulting from a state change of the halogen cycle, wherein
   the lighting unit performs a subsequent constant power control at the smaller power value as the target power value.

10. The lighting apparatus of claim 9, wherein
a range in which the lamp voltage is expected to be varied is divided into a plurality of voltage ranges, and a plurality of power values are set as the target power value in one-to-one correspondence with the voltage ranges, and
when the lamp voltage reaches an n-th voltage range resulting from the state change of the halogen cycle, the target power value is shifted to an n-th power value corresponding to the n-th voltage range, where n is a natural number, and as n is larger, the voltage range is higher.

11. A lamp system comprising:
a high-pressure mercury lamp that has a function of a halogen cycle to reduce electrode consumption; and
a lighting apparatus for lighting up the high-pressure mercury lamp, wherein
the lighting apparatus is the lighting apparatus of claim 9.

12. A lamp system comprising:
a high-pressure mercury lamp that has a function of a halogen cycle to reduce electrode consumption; and
a lighting apparatus for lighting up the high-pressure mercury lamp, wherein
the lighting apparatus is the lighting apparatus of claim 10.

13. A projection type display apparatus comprising:
a high-pressure mercury lamp for a light source; and
a lighting apparatus for lighting up the high-pressure mercury lamp, wherein
the high-pressure mercury lamp has a function of a halogen cycle to reduce electrode consumption, and
the lighting apparatus is the lighting apparatus of claim 9.

14. A projection type display apparatus comprising:
a high-pressure mercury lamp for a light source; and
a lighting apparatus for lighting up the high-pressure mercury lamp, wherein
the high-pressure mercury lamp has a function of a halogen cycle to reduce electrode consumption, and
the lighting apparatus is the lighting apparatus of claim 10.

* * * * *